US007593437B2

(12) United States Patent
Staroudoumov et al.

(10) Patent No.: US 7,593,437 B2
(45) Date of Patent: Sep. 22, 2009

(54) MOPA LASER APPARATUS WITH TWO MASTER OSCILLATORS FOR GENERATING ULTRAVIOLET RADIATION

(75) Inventors: Andrei Staroudoumov, Cupertino, CA (US); Andrea Caprara, Mountain View, CA (US); Norman Hodgson, Belmont, CA (US)

(73) Assignee: Coherent, Inc., Santa Clara, CA (US)

( * ) Notice: Subject to any disclaimer, the term of this patent is extended or adjusted under 35 U.S.C. 154(b) by 91 days.

(21) Appl. No.: 11/433,937

(22) Filed: May 15, 2006

(65) Prior Publication Data

US 2007/0263679 A1    Nov. 15, 2007

(51) Int. Cl.
*H01S 3/10* (2006.01)
(52) U.S. Cl. ......................................... 372/21; 372/22
(58) Field of Classification Search ................ 372/22, 372/21
See application file for complete search history.

(56) References Cited

U.S. PATENT DOCUMENTS

| 5,136,597 | A | | 8/1992 | Nightingale |
|---|---|---|---|---|
| 5,226,049 | A | | 7/1993 | Grubb |
| 5,497,265 | A | * | 3/1996 | Fontana et al. ............ 359/341.3 |
| 5,838,709 | A | * | 11/1998 | Owa ........................... 372/68 |
| 6,249,371 | B1 | * | 6/2001 | Masuda et al. .............. 359/326 |
| 6,498,801 | B1 | | 12/2002 | Dudelzak et al. |
| 6,590,698 | B1 | | 7/2003 | Ohtsuki et al. |
| 6,639,732 | B2 | | 10/2003 | Omura et al. |
| 6,653,024 | B1 | | 11/2003 | Shiraishi et al. |
| 6,741,620 | B2 | | 5/2004 | Gerstenberger et al. ....... 372/22 |
| 6,781,672 | B2 | | 8/2004 | Motegi |
| 6,894,826 | B2 | | 5/2005 | Doi |
| 7,006,539 | B1 | | 2/2006 | Sasaki et al. .................. 372/21 |
| 2002/0054613 | A1 | * | 5/2002 | Kang ............................. 372/6 |
| 2007/0064749 | A1 | | 3/2007 | Kaneda et al. ................ 372/21 |
| 2007/0064750 | A1 | | 3/2007 | Kaneda et al. ................ 372/21 |

OTHER PUBLICATIONS

A. Caprara et al., "200 mW Continuous Wave laser source at 198.5 nm for Lithographic Applications," *Proceedings of SPIE (Optical Microlithography XVII*, vol. 5377 (2004), pp. 1876-1885.
J. Sakuma et al., "CW DUV light sources for inspection tools," *Proc. of SPIE (25th Annual BACUS Symposium on Photomask Technology)*, vol. 5992 (2005), pp. 599243-1-599243-8.
J. Sakuma et al., "High power, narrowband, DUV laser source by frequency mixing in CLBO," *Advanced High-Power Lasers and Applications*, No. 20, Dec. 2000, pp. 7-14.

* cited by examiner

*Primary Examiner*—Minsun Harvey
*Assistant Examiner*—Patrick Stafford
(74) *Attorney, Agent, or Firm*—Morrison & Foerster LLP (57) ABSTRACT

Laser apparatus including two different, pulsed MOPAs, one having a fundamental wavelength of 1064 nm and the other having a fundamental wavelength of 1547 nm, provide trains of optical pulses. The 1064-nm pulses are frequency-quadrupled to a wavelength of 266 nm. The 1547-nm pulses are first mixed with the 266-nm pulses to provide pulses having a wavelength of 227 nm. The 227-nm pulses are then mixed with residual 1547-nm pulses from the first mixing to provide 198-nm output pulses of the apparatus.

25 Claims, 10 Drawing Sheets

FIG. 11

MOPA LASER APPARATUS WITH TWO MASTER OSCILLATORS FOR GENERATING ULTRAVIOLET RADIATION

TECHNICAL FIELD OF THE INVENTION

The present invention relates in general to fiber lasers. The invention relates in particular to generating ultraviolet (UV) radiation by frequency-converting the fundamental-wavelength output of fiber lasers having a fundamental wavelength of 1000 nanometers (nm) or longer, i.e., a wavelength in the near infrared (NIR).

DISCUSSION OF BACKGROUND ART

UV laser radiation at wavelengths less than 200 nm and average power greater than 1 Watt (W) is useful in industrial applications such as laser machining, lithography, and optical inspection. Presently, the only laser types that will generate 1 W or more of such radiation directly, i.e., as the fundamental wavelength, are excimer and molecular fluorine (F) lasers. These lasers are very expensive to operate and maintain compared with other laser types such as diode-pumped solid-state (DPSS) lasers, including fiber lasers, which, unfortunately, have fundamental wavelengths at 900 nm or more.

Generation of sub-200 nm UV radiation from a DPSS laser having a fundamental wavelength greater than 900 nm requires that the fundamental output of the laser be frequency converted by frequency-doubling and sum-frequency mixing in a series of optically nonlinear crystals. In order to convert the output of such lasers having a wavelength of 1000 nm or more to a wavelength less than 200 nm, conversion would have to be to the sixth or higher harmonic. Harmonic conversion is limited, however, by the availability of optically nonlinear crystal materials that can transmit UV radiation less than 200 nm. A crystal of cesium lithium borate (CLBO) is presently the most preferred crystal for converting at wavelengths less than 200 nm, but even so, is limited to converting to wavelengths longer than about 190 nm.

Ytterbium-doped (Yb-doped) fiber lasers and neodymium-doped (Nd-doped) yttrium aluminum garnet (YAG) lasers have a fundamental wavelength of about 1064 nm. The sixth harmonic of this fundamental wavelength is about 177 nm, which is shorter than can be converted in CLBO. The fifth harmonic however is a wavelength longer than 200 nm n. Erbium-doped (Er-doped) fiber-lasers can generate fundamental radiation at wavelengths between about 1510 nm and 1590 nm. The eighth harmonic (8H) of any of these wavelengths longer than 1520 nm would be less than 200 nm and within the conversion range of CLBO.

Schemes for generating the eighth harmonic of the output of an Er-doped fiber laser are disclosed in U.S. Pat. No. 6,590,698. In one conversion scheme disclosed therein, the second harmonic (2H) is generated in a first optically nonlinear crystal. The third-harmonic (3H) is generated in a second optically nonlinear crystal by sum frequency mixing the 2H-radiation with residual fundamental radiation. Fourth-harmonic (4H) radiation is generated by frequency doubling 2H-radiation in a third optically nonlinear crystal. A fourth optically nonlinear crystal sum-frequency mixes the 3H- and 4H-radiation to generate seventh-harmonic (7H) radiation having a wavelength of about 220 nm, and a fifth optically nonlinear crystal generates 8H-radiation (about 193-nm radiation) by sum-frequency mixing the 7H radiation with residual fundamental radiation.

As any sum-frequency mixing or frequency-doubling operation in an optically nonlinear crystal is at best about 80% efficient, but typically is only about 50% efficient, the overall conversion efficiency from a cascade of five such operations will be less than 3%. This would require a laser having a fundamental power of 32 W in order to provide UV (less than 200 nm) radiation having a power of more than 1 W.

U.S. patent application Ser. No. 11/387,400, filed Mar. 23, 2006, assigned to the assignee of the present invention and the complete disclosure of which is hereby incorporated by reference, discloses a UV generation apparatus in which UV output is generated by sum frequency mixing harmonics of each of two lasers, and fundamental radiation from one of the two lasers. Calculations indicate that an average output power of about 1.0 W of 198 m radiation can be generated from about 8.7 W of 1064-nm fundamental radiation and about 7.1 Watts of 1564 nm fundamental radiation in five frequency-conversion stages. This is a total fundamental power of about 15.8 W, and represents a total-fundamental-power to 198-nm-output conversion efficiency of about 6.6%. It is not clear from the disclosure whether or not there would be a significant improvement in efficiency if higher fundamental power were available. However, it can be concluded from the disclosure that in order to effect a significant increase of the output power it would be necessary to increase the fundamental output power of each of the two lasers about equally. This could add significant cost to the apparatus.

There is a need for a continuing increase in efficiency and output power in apparatus for generating sub-200 nm wavelength radiation by frequency multiplication of the output of solid-state lasers. Preferably this should be achieved without a percentage increase in cost of the apparatus that is less than the percentage increase in output power.

SUMMARY OF THE INVENTION

The present invention is directed to methods of generating UV optical pulses, in particular, to generating optical pulses having a wavelength less than 200 nm. In one aspect, the invention comprises delivering radiation having a first fundamental wavelength from a first laser, and delivering radiation having a second fundamental wavelength from a second laser. The first fundamental wavelength is between about 975 nm and 1100 nm, and the second fundamental wavelength is between about 1500 nm and 1599 nm. The first-fundamental-wavelength radiation is frequency converted to provide radiation having a wavelength which is a harmonic-wavelength of the first fundamental wavelength. The harmonic-wavelength radiation is sum frequency mixed with the second-fundamental-wavelength radiation to provide radiation having a first frequency-converted wavelength that is less than the harmonic-wavelength. The first frequency-converted-wavelength radiation is sum frequency mixed with the second-fundamental-wavelength radiation to provide frequency-converted output radiation which has a second frequency-converted wavelength, the second frequency-converted wavelength being less than the first frequency-converted wavelength.

In examples of the inventive method, the first laser provides repetitive pulsed output at a wavelength of 1064 nm, and the second laser provides repetitive pulsed output at a wavelength of about 1547 mm. The 1064-nm pulses are frequency quadrupled in two frequency multiplication stages to provide pulses having a wavelength of 266 nm. In a third frequency conversion stage, the 266-nm pulses are sum frequency mixed with 1547-nm pulses from the second laser to provide pulses having a wavelength of 227 nm. In a fourth frequency conversion stage the 227-nm pulses are sum frequency mixed with residual 1547-nm pulses from the third frequency conversion stage to provide output pulses having a wavelength of 198 nm.

Calculations indicate that the 198-nm output pulses can have 1.0 W of average power for an average power output of about 13.3. W delivered from the first laser, and about 9.2 W delivered from the second laser. Calculations indicate that the 198-nm output pulses can have 10.0 W of average power for an average power output of about 39.2 W from the first laser and about 15.5 W from the second laser. This indicates that scaling output power in the inventive apparatus can be achieved primarily by scaling the output power of the first (shorter-wavelength) laser. The 10 W of 198-nm average output power is achieved at an efficiency of conversion of the total fundamental output power of the two lasers of about 18% (0.18).

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the present invention.

FIG. 1 schematically illustrates one preferred embodiment of apparatus in accordance with the present invention including first and second optical fiber, master-oscillator power-amplifiers (MOPAs) generating laser radiation pulses at respectively first and second fundamental wavelengths, the MOPAs being slaved to a master clock via a phase shifter, and the apparatus further including four optically nonlinear crystals, a first and second of the optically nonlinear crystals generating the fourth-harmonic of the first fundamental wavelength, a third of the optically nonlinear crystals mixing the fourth harmonic of the first fundamental wavelength with the second fundamental wavelength to provide an intermediate UV wavelength and residual second-fundamental-wavelength radiation, and a fourth of the optically nonlinear crystals mixing the intermediate UV wavelength with the residual second-fundamental-wavelength radiation to provide output pulses of UV radiation having a wavelength less than 200 nm.

DETAILED DESCRIPTION OF THE INVENTION

Figure 1:
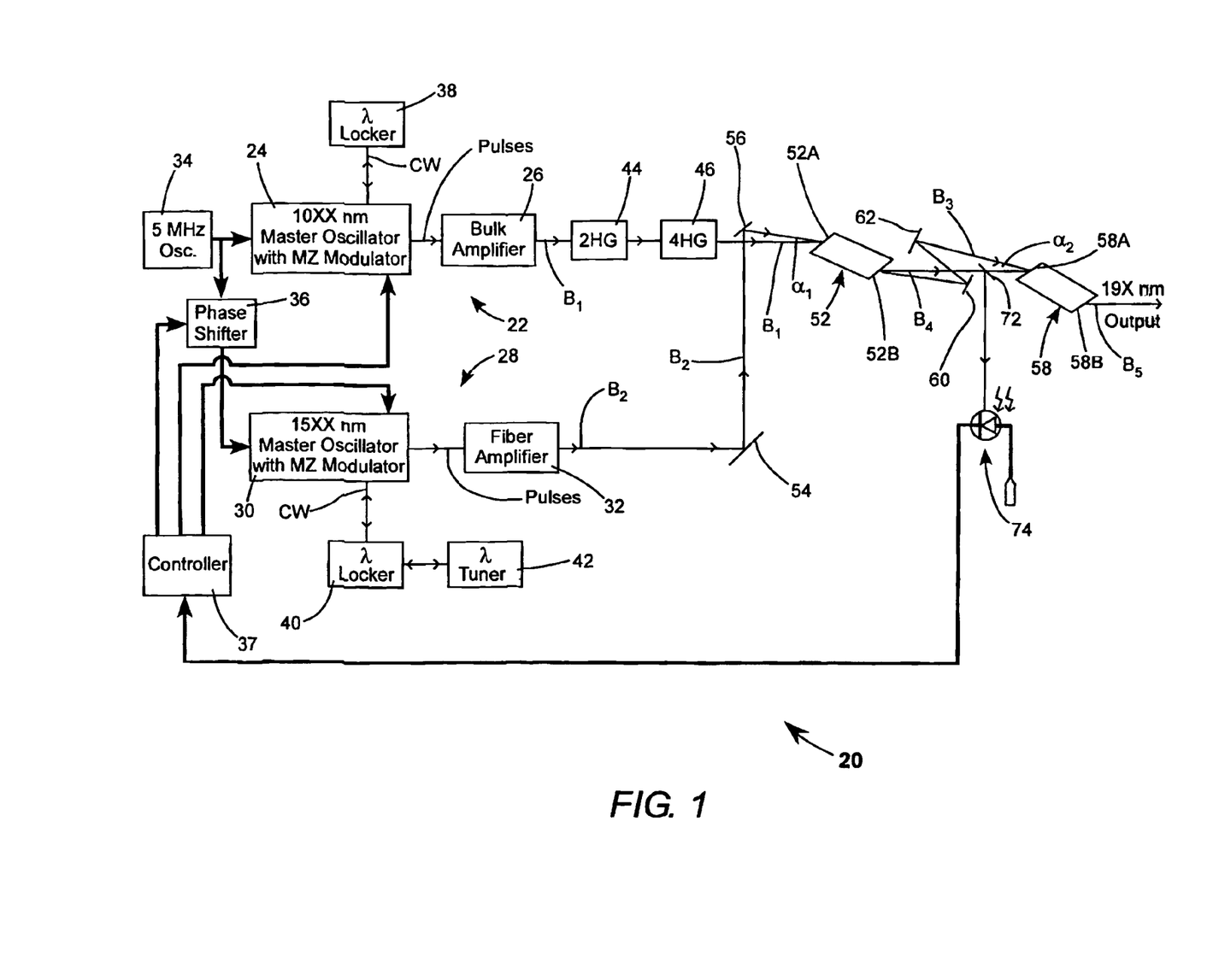

Referring now to the drawings, wherein like components are designated by like reference numerals, FIG. 1 schematically illustrates one preferred embodiment 20 of laser apparatus in accordance with the present invention. In the drawing, optical beam paths are depicted by fine lines, with open arrowheads indicating propagation direction. Electrical or electronic connections are depicted in bold line, with the communication direction indicated by closed arrowheads.

Apparatus 20 includes generic fiber laser MOPAs 22 and 28. MOPA 22 includes a fiber master oscillator 24 (seed-laser) providing fundamental radiation at a wavelength between about 1000 and 1099 nm (designated in FIG. 1 and referred to hereinafter as 10XX nm radiation). This wavelength range is the most common range of operation in ytterbium-doped and neodymium-doped fiber amplifiers. This range can, however, extend to about 1150 nm for a long wavelength limit and to about 975 nm for a short wavelength limit.

The oscillator is preferably operated in a continuous-wave (CW) mode with the CW output being modulated, preferably by a modulator such as an integrated Mach-Zehnder (MZ) modulator. At the 10XX nm wavelength, it may be found advantageous to employ two such modulators in series to ensure an acceptable contrast ratio. Laser 24 can also be a fiber laser, distributed feedback (DFB) or distributed Bragg reflector (DBR) diode laser, an extended cavity diode laser (with a wavelength stabilizing fiber Bragg grating in close proximity to the diode), or a solid-state laser. For most of the above-mentioned lasers a wavelength locking mechanism is provided by an integrated grating structure in the cavity. If a precise control of a central wavelength is required then an external wavelength locker (38) can be used. In that case, a portion of the CW radiation is directed to a wavelength locker 38 that maintains a predetermined operating wavelength of the laser. Pulses output by the modulated fiber laser are amplified by a bulk (solid-state) amplifier 26. Laser 24 may also be provided with a fiber pre-amplification stage. This is discussed in detail further hereinbelow. As fiber lasers, fiber amplifiers, wavelength lockers and MZ modulators are well known in the art to which the present invention pertains, and a detailed description thereof is not necessary for understanding principles of the present invention, such a detailed description is not presented herein.

MOPA 28 is arranged similar to MOPA 22. A fiber laser 30 of MOPA 28 includes an Er-doped gain fiber. Laser 30 is operated in the same manner as laser 24 of MOPA 22 and, in this example, provides laser pulses having a wavelength between about 1500 nm and 1599 nm (designated in FIG. 1 and referred to hereinafter as 15XX nm radiation) to an optical fiber amplifier 32, such as a large mode area (LMA) erbium and ytterbium-doped (Er:Yb:LMA) fiber amplifier. Laser 30 is preferably a single-frequency fiber laser. However, laser 30 may also be a DFB or DBR diode-laser, an extended-cavity diode-laser, or a solid-state laser. Single-frequency diode-lasers emitting in the range between about 1510 nm and about 1599 nm are available at any predetermined wavelength close to a standard grid of telecommunication wavelengths. If a precise control of a central wavelength is required, an external wavelength locker 40 and tuner 42 can be used. In that case, a portion of the CW radiation is directed to a wavelength locker 40, which maintains a predetermined operating wavelength of the laser. A tuner 42 provides that the locked wavelength is adjustable within the tuning range of the Er-doped gain fiber. As several tuning schemes for Er-doped fiber lasers are well-known in the art, and as a knowledge of such schemes is not necessary for understanding principles of the present invention, a detailed description of any one of the schemes is not presented herein.

Pulse delivery by MOPAs 22 and 28 is controlled by a controller 37 cooperative with a 5-MHz oscillator 34, a phase shifter 36, and the integral MZ modulators (not explicitly shown) of the master oscillators. A radio frequency (RF), here, 5 MHz, signal voltage from oscillator 34 is delivered to one electrode of the MZ modulator (or modulators) of master oscillator 24 and via phase shifter 36 to one electrode of the MZ modulator of master oscillator 30. Controller 37 provides digital signals to another electrode of the MZ modulators of the master oscillators for keying the MZ modulators. Each master oscillator delivers a train of pulses at a pulse repetition frequency (PRF) that is determined by the frequency of oscillator 34, and with a pulse duration that is determined by the keying signals applied to the MZ modulators. The phase difference between the two pulse trains is controlled by controller 37, in cooperation with phase shifter 34, using standard phase-shift-keying (PSK) techniques. MOPAs as described here will deliver pulses at a PRF in the megahertz range with pulse durations of less than 5 ns and even less than 1 ns.

It should be noted, here, that while the above described modulation scheme is a preferred modulation scheme, other modulation schemes may be employed without departing from the spirit and scope of the present invention. By way of example, master oscillators 24 and 30 may be directly modulated by modulating the optical pump source of the lasers. Whatever modulation scheme is employed, however, there must be some provision for adjusting the relative phase of pulse trains emitted by the lasers.

Provision of phase control is important in apparatus 20, as frequency-converted pulses from each MOPA are required to be further frequency converted by at least one optically nonlinear crystal, common to both. The fiber length in each MOPA amplifier will almost certainly be different. Beam paths followed delivery of pulses from each MOPA to a common crystal will also almost certainly be different. This being the case, and given that a 1-ns pulse has an optical path length in air of only about 30 centimeters (cm), phase control between the pulse trains generated by the MOPAs must be provided to ensure that the corresponding frequency converted pulses arrive simultaneously (temporally overlapping) at the common optically nonlinear crystal, thereby allowing further frequency conversion to take place. Phase control can be automatically implemented by detecting the mixing product output of any common optically nonlinear crystal, and communicating this output to controller 37. Controller 37 can then command phase shifter 36 to adjust the relative phase of the MOPAs until the detected mixing product is maximized. This phase control also enables a method of either digitally modulating or amplitude modulating UV output pulses of the apparatus.

Continuing with reference to FIG. 1, in a preferred frequency-conversion architecture for pulses delivered by MOPAs 22 and 28, amplified 10XX-nm pulses from fiber amplifier 26 follow a path $B_1$ to an optically nonlinear crystal 44, which is arranged to generate the second harmonic (2HG) of the pulse wavelength. In this preferred conversion architecture, crystal 44 is a lithium borate (LBO) crystal, preferably between about 10 millimeters (mm) and 20 mm long, and arranged for non-critical phase matching. 2H-radiation pulses generated by crystal 44 and having a wavelength of about 5XX nm (half the 10XX wavelength) are again frequency doubled in another optically nonlinear crystal 46 to generate fourth-harmonic (4H) pulses having a wavelength of about 2XX nm (half the 5XX wavelength). Crystal 46 is preferably a cesium lithium borate (CLBO) crystal preferably between about 5 mm and 15 mm long, and also arranged for non-critical phase matching.

Amplified 15XX-nm pulses from fiber amplifier 32 follow a path $B_2$. The 2XX-nm pulses from crystal 46 proceed along path $B_1$ and are incident on a face 52A of an optically nonlinear crystal 52. Crystal 52 is preferably a CLBO crystal between about 10 mm and about 15 mm long, and is cut and arranged such that the 2XX-nm radiation is incident at Brewster's angle for the crystal material at that wavelength. Path $B_2$ is folded by mirrors 54 and 56 such that 15XX-nm pulses traveling therealong are incident on face 52A of crystal 52 at an angle close to Brewster's angle for the crystal material at the 15XX-nm wavelength, such that the 15XX-nm radiation propagates substantially collinear with the 2XX-nm radiation within crystal 52. This means, for a CLBO crystal, that there will be an angle of about 1.6 degrees between paths $B_1$ and $B_2$ at face 52A of the crystal. Crystal 52, in this example is arranged for Type-I phase-matching for the 2XX-nm and 15XX-nm wavelengths and generates radiation pulses having a wavelength of about 2YY-nm (where 2YY is less than 2XX) by sum-frequency mixing, provided, of course, the above-described phase control between the MOPAs is adjusted such that the 2XX-nm and 15XX-nm radiation arrive simultaneously at crystal 52.

The 2YY-nm radiation pulses exit crystal 52 via face 52B thereof along a path $B_4$. A beam sampler 72, for example, a tilted, uncoated calcium fluoride ($CaF_2$) plate, directs a portion (for example, less than 1%) of the output of crystal 52 to a high speed UV photodiode 74. The output of photodiode 74 is transmitted to controller 37 for phase control implementation as discussed above. The remaining portion of the 2YY-nm pulses are incident on a face 58A of an optically nonlinear crystal 58. Crystal 58 is also preferably a CLBO crystal, about 15 mm long, and cut and arranged for Type-I phase matching for the 2YY-nm wavelength and residual 15XX radiation. Path $B_3$, along which residual 15XX-nm radiation pulses are propagating, is folded by mirrors 60 and 62 such that the 15XX-nm radiation pulses are incident on face 58A of crystal 58 at an angle close to Brewster's angle for the crystal material at the 1064-nm wavelength, such that the 2YY-nm radiation propagates substantially collinear with the 15XX-nm radiation inside crystal 58. For a CLBO crystal, there will be an angle of about 4.5 degrees between paths $B_3$ and $B_4$ at face 58A of crystal 58. Crystal 58 generates 19X-nm radiation (output) pulses by sum-frequency mixing the 2YY-nm and residual 15XX-nm input pulses. Care must be taken to match the optical length of paths $B_3$ and $B_4$ between crystal 52 and crystal 58 such that the desired phase relationship of the 15XX-nm and 2YY-nm pulses is maintained at crystal 58.

The 19X-nm output pulses exit crystal 58 via face 58B thereof along a beam path $B_5$. Any residual (longer) wavelength pulses exiting crystal 58 will be propagating at some angle to path $B_5$ and can be separated from the 198-nm pulses by spatial filtering.

It is important that output pulses from MOPA 22 have about the same temporal pulse width as output pulses from MOPA 28. This is because sum-frequency mixing can only occur when both radiations are co-propagating in the optically nonlinear crystals in which the mixing is taking place. In apparatus 20, the MZ modulator arrangement in MOPAs provides a means of accurately selecting and controlling temporal pulse widths.

It should be noted here that while CLBO is a particularly preferred crystal material for crystal 58, there is another crystal material, potassium aluminum borate (KABO) that may also be more or less useful, depending on the particular wavelengths that are to be finally mixed. The material has a phase-matching limit that extends to shorter fundamental wavelengths than that of CLBO, has a transparency comparable to CLBO and has a nonlinear coefficient that is between about 0.2 pM/V and 0.45 pM/V. This material, however, has not yet been commercially developed. Other possible crystal materials are potassium beryllium barium fluoride (KBBF), and yttrium aluminum borate (YAB), which also in the early stages of commercial development.

Those skilled in the art will recognize without further illustration that instead of using residual 15XX-nm radiation for the sum frequency mixing in crystal 58, it is possible to divide the 15XX radiation output of MOPA 28 two portions using a beamsplitter or the like, then use one portion for sum frequency mixing in crystal 52 and the other portion for sum frequency mixing in crystal 58. This, is not as efficient however as the sum frequency mixing arrangement using residual 15XX radiation described above with reference to FIG. 1.

It should be noted here that a major shortcoming of 15xx-nm Er:Yb-doped fiber amplifiers is a low conversion efficiency (of pump power to output power), for example, between about 25% and 35%. By way of comparison Yb-doped fiber amplifiers for 10XX-nm amplification have a conversion efficiency between about 50% and 80%. Because of this, an increase of output power from an Er:Yb fiber amplifier by a factor of two will require at least between about 2 and 3 times more pump power than would be required to provide the same increase in a Yb-doped fiber amplifier. Further, existing bulk amplifiers at 1510-1590 nm, wherein gain media are typically Er:Yb glasses, have poor thermal properties and power scaling compared to those of bulk amplifiers for 10xx-nm, which typically employ crystal gain media. Accordingly, power up-scaling at 15xx-nm, while preserving a narrow linewidth of optical radiation, is more difficult and expensive than power up-scaling at 10XX nm.

Apparatus 20 has certain advantages over prior-art apparatus in that by employing two lasers, the power required to be produced by the 15XX-nm laser is reduced compared with above discussed schemes in which only an Er-doped fiber laser is employed. In the inventive scheme, each laser is operating at a wavelength close to a peak-gain wavelength. The total number of frequency conversion (sum-frequency mixing or harmonic generating) stages for the apparatus is only four. An advantage of the apparatus relating to the frequency conversion architecture thereof is that combining beam paths $B_1$ and $B_2$ and beam paths $B_3$ and $B_4$ by Brewster's angle incidence at the corresponding crystal faces eliminates a requirement for dichroic mirrors to provide such beam-path combination. At wavelengths less than about 400 nm, even the best commercially available such mirrors are lossy to some extent, and become increasingly lossy the shorter the wavelength. Such mirrors are also subject to degradation by short-wavelength UV radiation.

Figure 2:
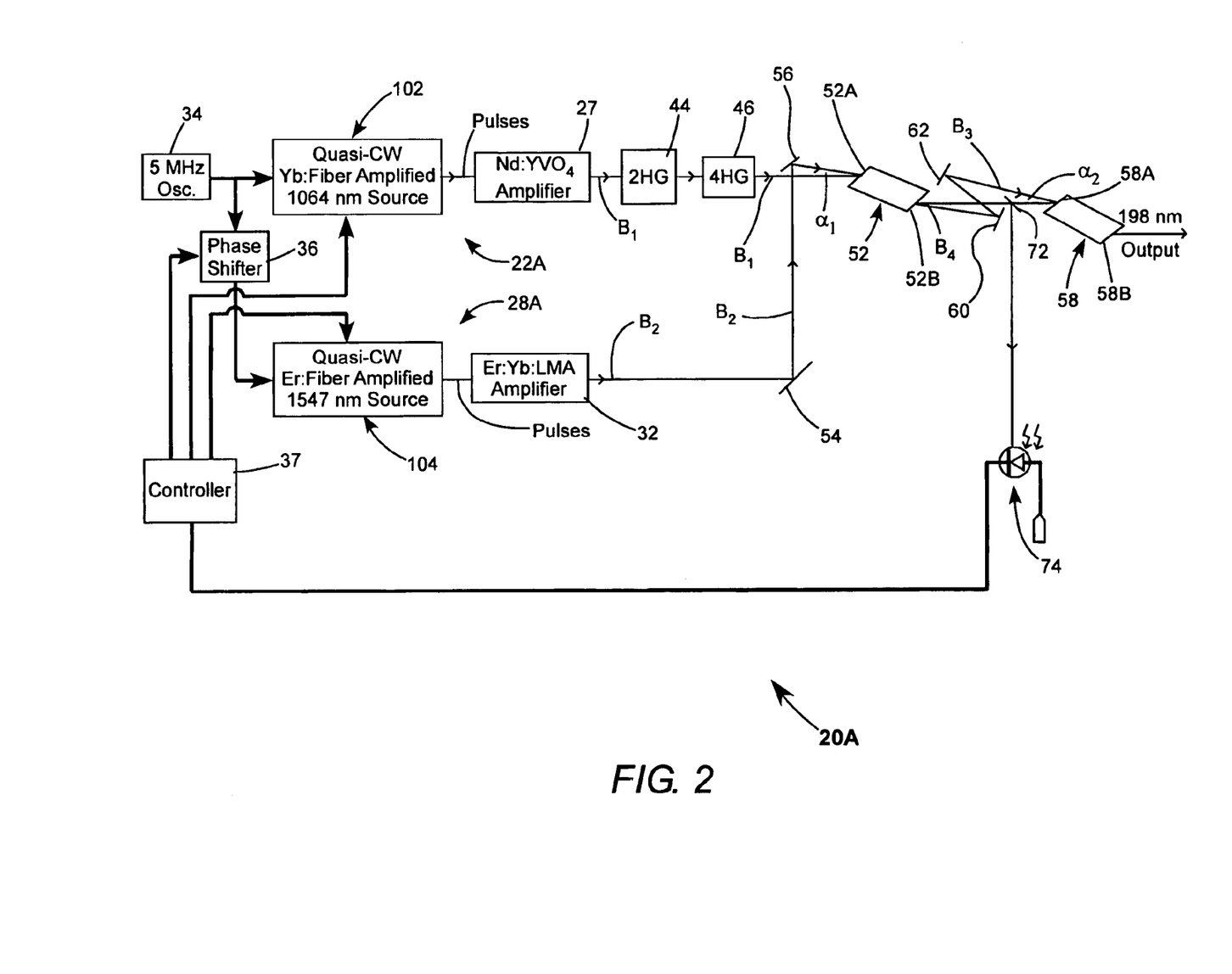
FIG. 2 schematically illustrates another preferred embodiment of apparatus in accordance with the present invention, similar to the apparatus of FIG. 1, wherein the first MOPA has an output wavelength of 1064 nm, the second MOPA has an output wavelength of 1547 µm, and the UV output pulses have a wavelength of about 198 nm.

FIG. 2 schematically illustrates another preferred embodiment 20A of apparatus in accordance with the present invention. Apparatus 20A is similar to above discussed apparatus 20 of FIG. 1 with exceptions as follows. In apparatus 20A, MOPA 22A includes a quasi-CW modulated ytterbium-doped (Yb-doped) amplified fiber laser 102, pulses of which are amplified by a bulk (solid-state) amplifier 27 having a gain-medium of neodymium-doped yttrium vanadate Nd:YVO$_4$. The term "quasi-CW" here refers to a laser source having a pulsed output at a pulse-repetition frequency (PRF) of about 0.2 MHz or greater. By way of example source, 102 is exemplified in above described apparatus 20A as having a PRF of 5.0 MHz, slaved to master clock 34. MOPA 22A has an output wavelength of 1064 nm. MOPA 28A includes an amplified Er-doped fiber laser 104, pulses of which are amplified by a large mode area (LMA) erbium and ytterbium-doped (Er:Yb:LMA) fiber amplifier 32 as discussed above. MOPA 28A has an output wavelength of 1547 nm. Preferred examples of each of these MOPA arrangements are described in detail further hereinbelow.

Figure 3:
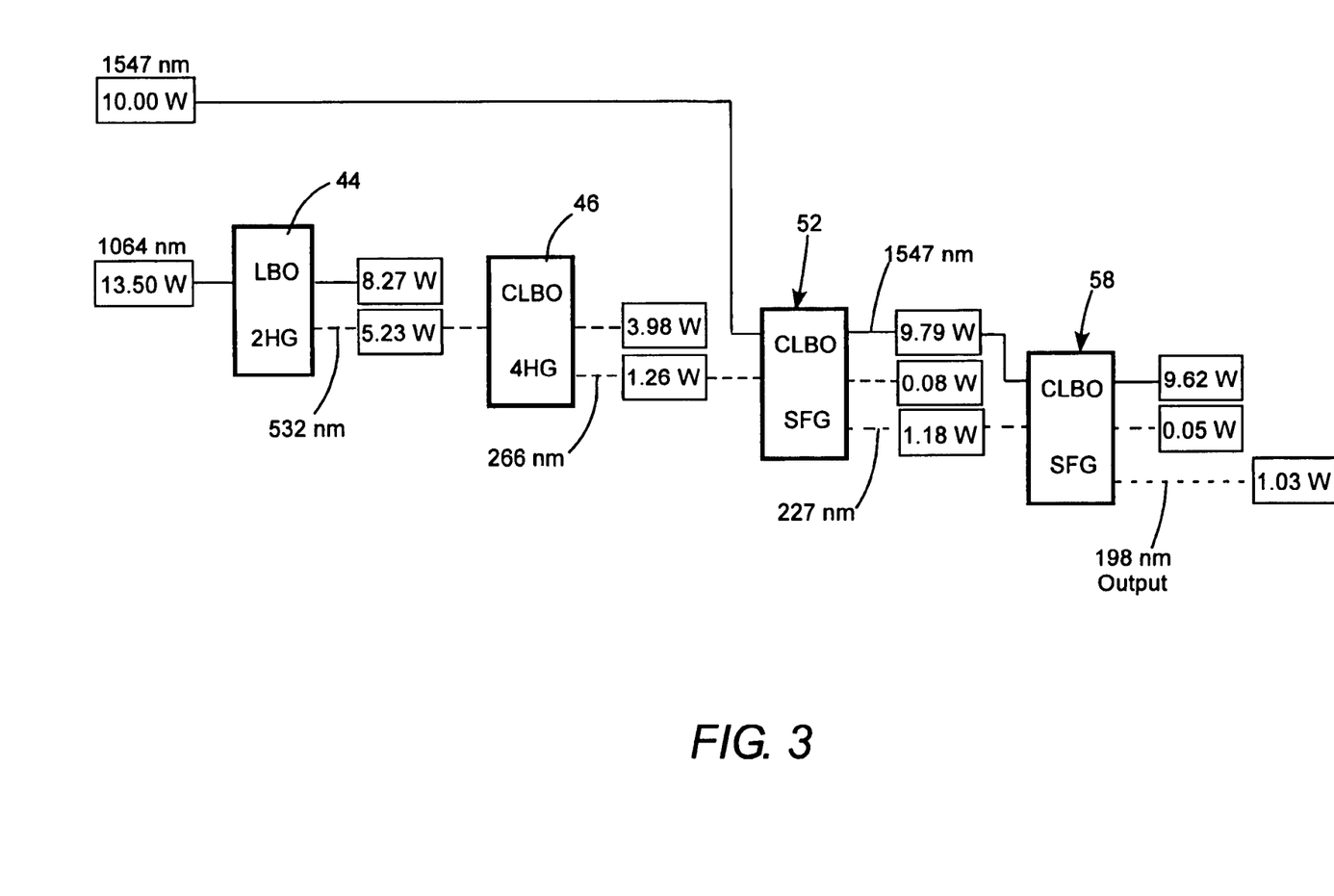
FIG. 3 is a block diagram schematically illustrating computed power of intermediate wavelengths after each conversion stage, and power of 198-nm output radiation in one example of the apparatus of FIG. 2.

FIG. 3 is a block diagram, schematically depicting the computed power of frequency-converted wavelength components at each frequency-conversion stage in an example of the apparatus of FIG. 2 in which the MOPAs are assumed to deliver pulses having a duration of about 1.0 ns at a PRF of 5.0 MHz. MOPA 22A is assumed to have a 1064-nm average power output of 13.5 W. MOPA 28A is assumed to have a 1547-nm average power output of 13.5 W. 198 nm average output power is about 1.03 W. A beam diameter in each crystal of about 80.0 micrometers (μm) is assumed. The crystals are represented by bold-outlined blocks and designated by the same reference numerals as the crystals in FIG. 2.

While FIG. 3 is essentially self explanatory, it is worthwhile to note that relatively little of the 1547-nm power is consumed by the two sum-frequency mixing or sum-frequency generation (SFG) stages. Further, the UV power is reduced by a relatively small percentage on being converted from 266 nm to 198 nm in the SFG stages. This would suggest that scaling output power could be achieved primarily by increasing the 1064-nm power, with correspondingly little increase of 1547-nm power being required. This is confirmed in the graph of FIG. 4, which schematically depicts, in contour graph form, computed 198-nm output power (the contours) as a function of average fundamental power delivered by MOPAs 22A and 28A for pulses having a duration of 1 ns delivered at a frequency of 5.0 MHz. In computing the output power contours, the same assumptions are made that are made in the computations of FIG. 3.

Figure 4:
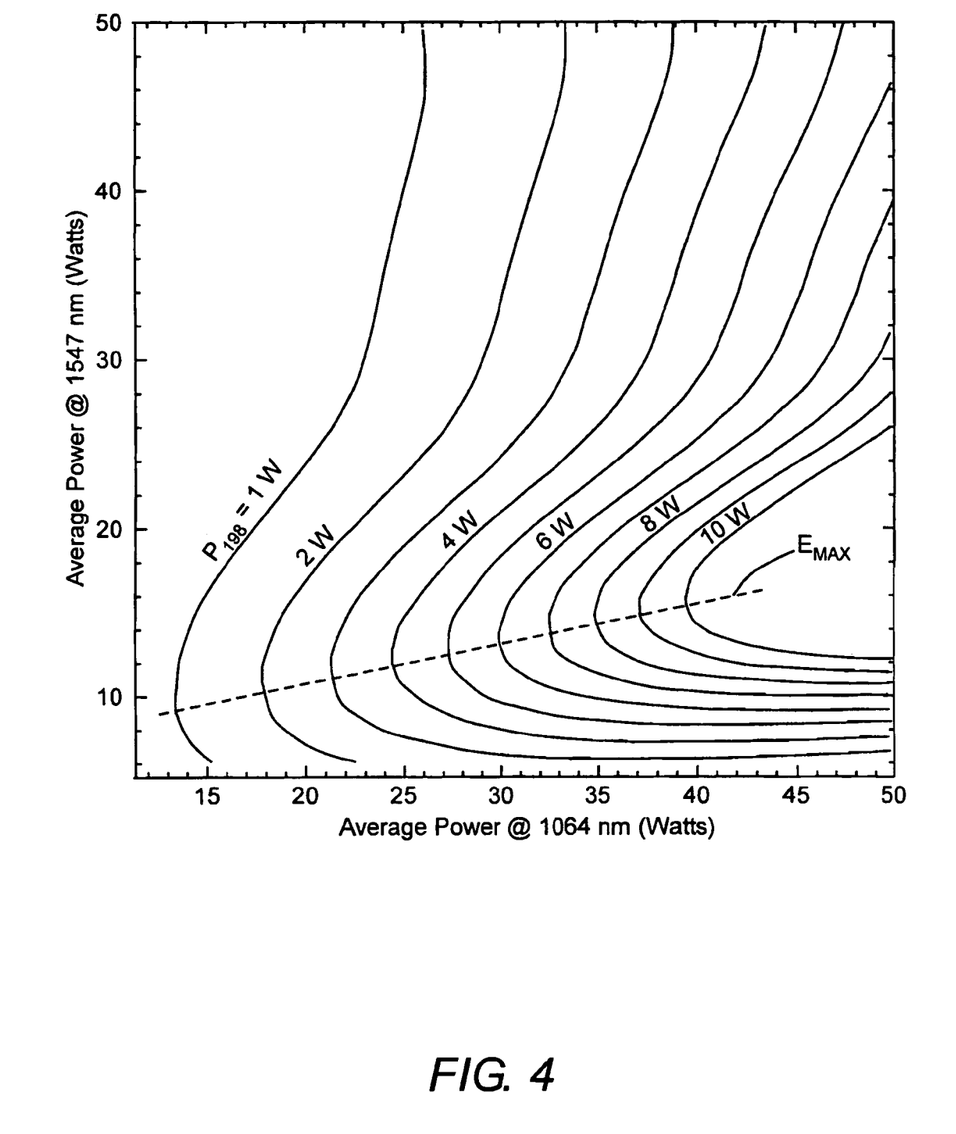
FIG. 4 is a contour graph schematically illustrating computed output radiation power as a function of average fundamental power of the first and second MOPAs in the example of FIG. 2.
Figure 5:
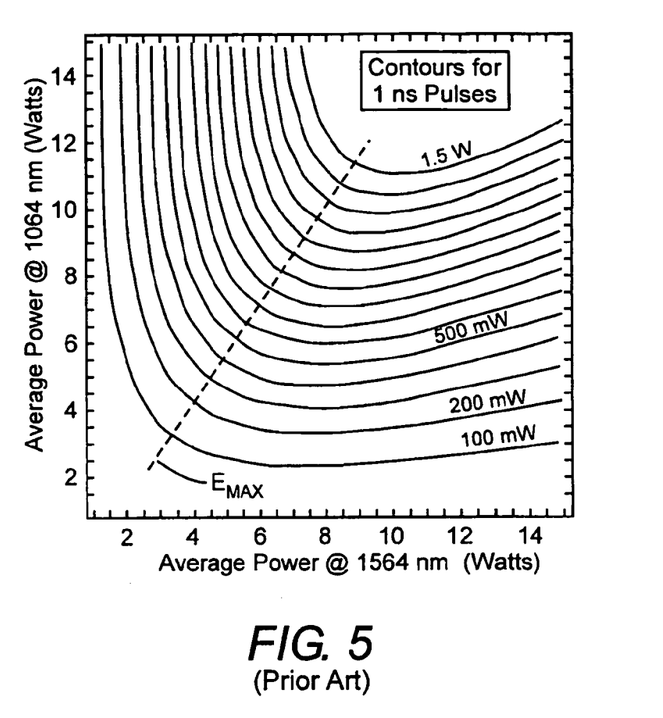
FIG. 5 is a contour graph schematically illustrating computed output radiation power as a function of average fundamental power in a prior-art arrangement for generating 198-nm radiation for 1064-nm radiation and 1568-nm radiation.

Dashed line $E_{MAX}$ in the graph of FIG. 4 indicates the combination of 1064-nm power and 1547-nm power that would provide maximum conversion efficiency of total fundamental power at the various power levels. The graph contours indicate that 198-nm output pulses can have 1.0 W of average power for an average 1064-nm power of about 13.3 W, and an average 1547-nm power of about 9.2 W. Similarly, the contours indicate that the 198-nm output pulses can have 10.0 W of average power for an average 1064-nm power of about 39.2 W and an average 1547-nm power of about 15.5 W. This indicates that scaling output power in apparatus of FIG. 2 is achieved primarily by scaling the output power of the 1064 nm laser. By way of comparison, FIG. 5 schematically illustrates computed contour plots for 198 nm output pulses generated from 1064-nm and 1547-nm radiation in one example of prior-art art apparatus described in the above-discussed application (Ser. No. 11/387,400). Here, it can be seen that increasing output power requires about equal contributions from each power source.

Figure 6:
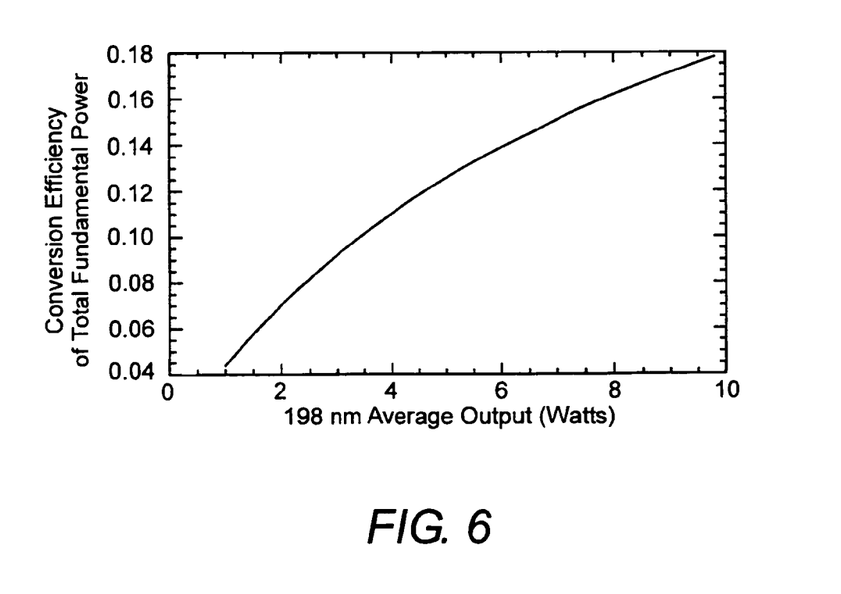
FIG. 6 is a graph schematically illustrating computed conversion efficiency as a function of 198-nm average output power in one example of the apparatus of FIG. 2.

FIG. 6 is a graph schematically illustrating computed conversion efficiency of total fundamental power as a function of output power, derived from the computations of FIG. 4. Here, the graph indicates that 10 W of 198-nm average output power may be achieved at an efficiency of conversion of the total fundamental output power of the two lasers of about 18% (0.18).

Figure 7:
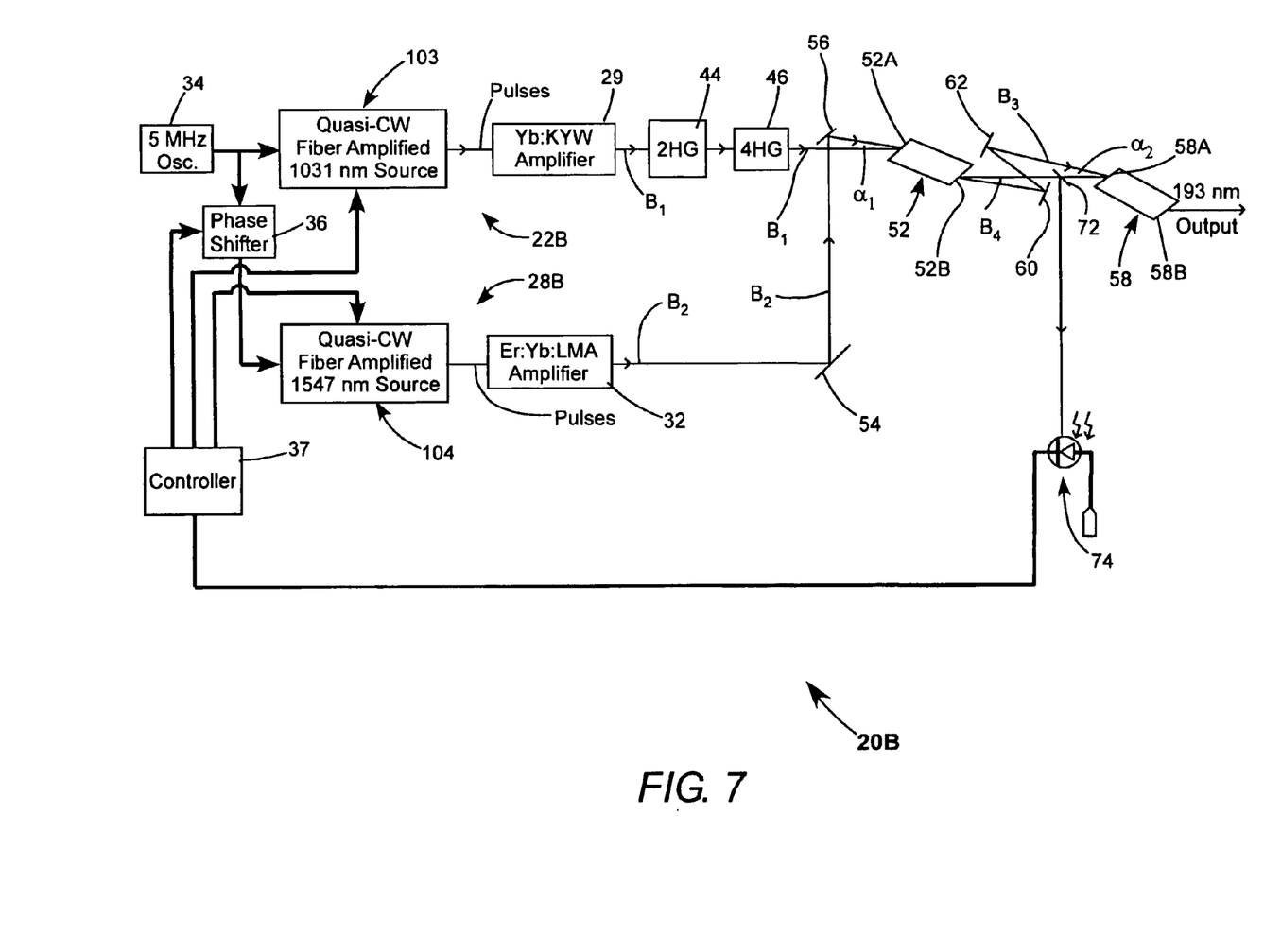
FIG. 7 schematically illustrates yet another preferred embodiment of apparatus in accordance with the present invention, similar to the apparatus of FIG. 1, wherein the first MOPA has an output wavelength of 1031 nm, the second MOPA has an output wavelength of 1547 nm, and the UV output pulses have a wavelength of about 193 nm.

FIG. 7 schematically illustrates another preferred embodiment 20B of apparatus in accordance with the present invention. Apparatus 20B is similar to above discussed apparatus 20 of FIG. 1 with exceptions as follows. In apparatus 20B, MOPA 22B includes a modulated ytterbium-doped (Yb-doped) amplified fiber laser 103 pulses of which are amplified by a bulk (solid-state) amplifier 29, preferably having a gain-medium of ytterbium-doped potassium yttrium tungstate ($KY(WO_4)_2$ or simply KYW). MOPA 22B has an output wavelength of 1031 nm. MOPA 28B includes an Er-doped fiber laser 104 pulses of which are amplified by a large mode area (LMA) erbium and ytterbium-doped (Er:Yb:LMA) fiber amplifier 32. MOPA 28B has an output wavelength of 1547 nm.

Figure 8:
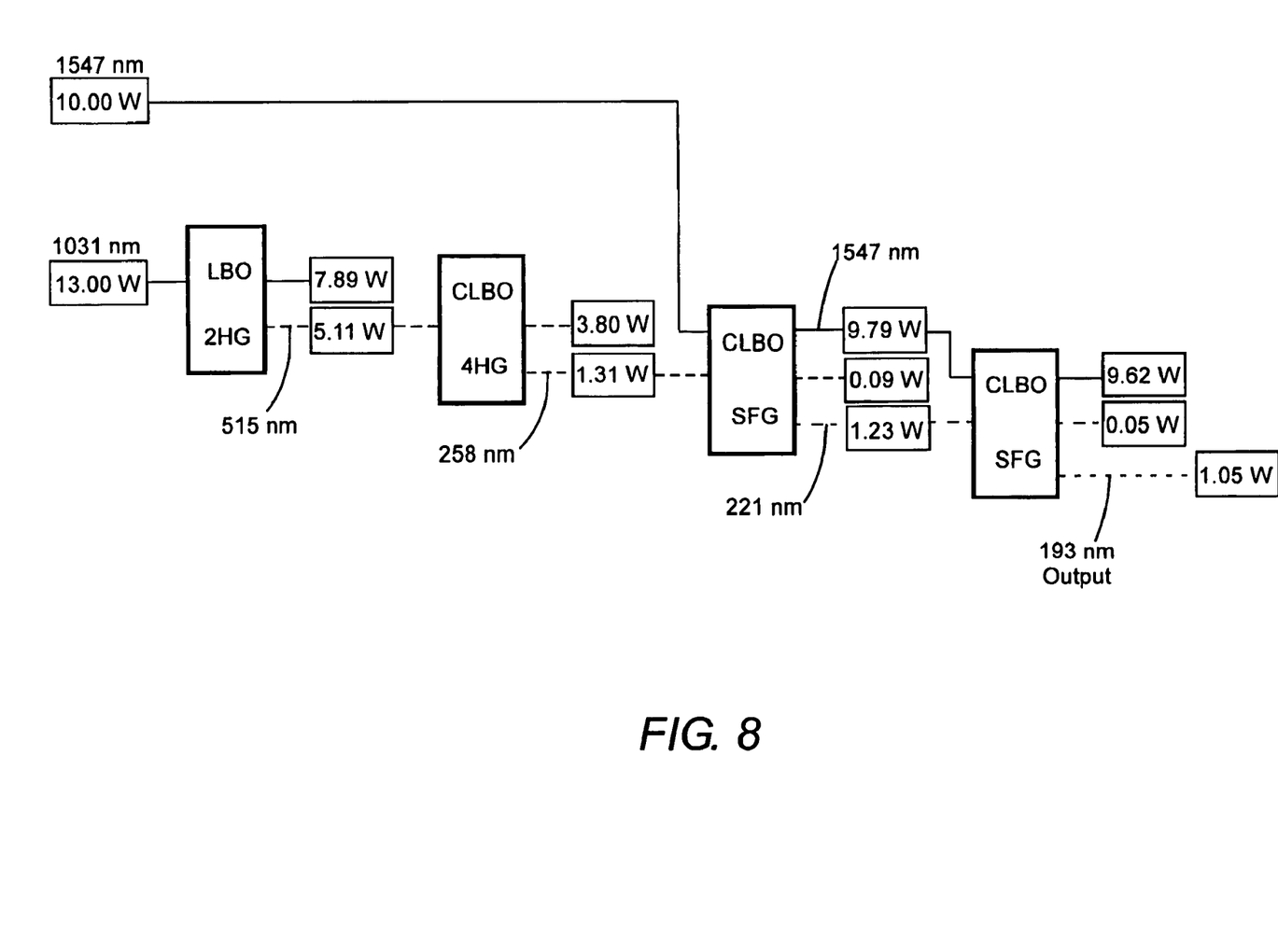
FIG. 8 is a block diagram schematically illustrating computed average power of intermediate wavelengths after each conversion stage, and power of 193-nm output radiation in one example of the apparatus of FIG. 7.

FIG. 8 is a block diagram, schematically depicting the computed power of frequency converted wavelength components at each frequency conversion stage in an example of the apparatus of FIG. 7 in which the MOPAs are assumed to deliver pulses having a duration of about 1.0 ns at a PRF of 5.0 MHz. MOPA 22B is assumed to have a 1031-nm average power output of 13.5 W. MOPA 28B is assumed to have a 1547-nm average power output of 10.0 W. 198-nm average output power is about 1.05 W. A beam diameter in each crystal of about 80.0 micrometers (μm) is assumed. The crystals are represented by bold-outlined blocks and designated by the same reference numerals as the crystals of FIG. 7.

Figure 9:
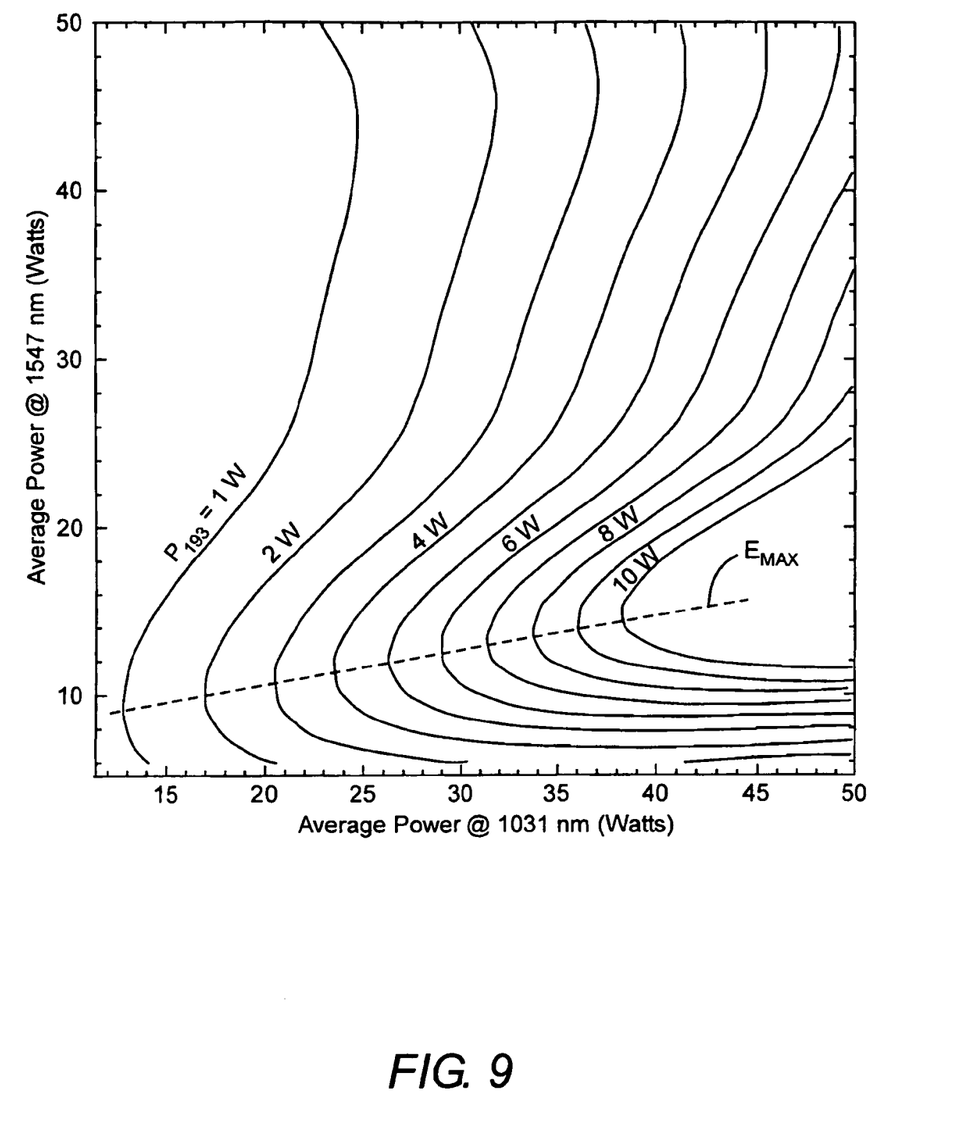
FIG. 9 is a contour graph showing computed average output radiation power as a function of average fundamental power of the first and second MOPAs in the example of FIG. 8.

FIG. 9, schematically depicts, in contour graph form, computed 193-nm output power as a function of average fundamental power delivered by MOPAs 22B and 28B for pulses having a duration of 1 ns delivered at a frequency of 5.0 MHz. In computing the output power the same assumptions are made that are made in the computations of FIG. 8.

Dashed line $E_{MAX}$ in the graph of FIG. 9 indicates the combination of 1031-nm power and 1547-nm power that would provide maximum conversion efficiency of total power at the various power levels. Here again it can be seen that increasing UV output power is optimally achieved primarily by increasing the power of the shorter wavelength MOPA, i.e., the MOPA, the output of which is frequency quadrupled prior to being mixed with the fundamental wavelength of the longer wavelength MOPA.

The efficiencies calculated by the graphs of FIGS. 4 and 9 are based on a beam size of 80 μm in all of the crystals. With this beam size, particularly at the higher powers the lifetime of CLBO crystals may be limited to a duration that is less than commercially attractive. It is believed that, all else being equal, increasing the beam size to about 260 μm could extend the crystal lifetime to at least about 1000 hours, this, however, would reduce the efficiency for 1.0 W output to about 2%. Methods have been suggested in prior-art documents for preventing deterioration of CLBO by UV radiation. These suggested methods include using certain coatings on crystal faces; locating the crystals in vacuum or hermetically-sealed enclosures; raising the temperature of the crystals; and ion-beam etching surfaces of the crystals to remove embedded polishing compounds. In developing the inventive frequency conversion architecture, no attempt has been made to evaluate the effectiveness of any of these suggested lifetime-extending methods. Further, as the frequency-conversion architecture of the present invention is not limited to CLBO, either in frequency-quadrupling stages or SHG stages, it is also possible that extended operating lifetime of the inventive apparatus can be achieved simply by substituting another crystal type such as the above-mentioned KABO, KABF, or YAB.

It is emphasized, here, that the present invention is not limited to using two pulsed lasers (or MOPAs) of any particular type. Preferably, however, any laser used as one of the two lasers in the inventive apparatus should provide a fundamental wavelength between about 800 nm and 1700 nm. Any two lasers used in the inventive apparatus preferably either inherently deliver, or can be controlled to deliver, pulses of about the same duration. Any two lasers used in the inventive apparatus must also be capable of being synchronized such that frequency multiplied (harmonic) pulses generated from the shorter-wavelength laser can be delivered simultaneously to an optically nonlinear crystal arranged to sum-frequency mix the harmonic pulses, with pulses of fundamental-wavelength radiation from the longer-wavelength laser.

It is emphasized again that the frequency-converted-output modulation scheme described above is not limited to use with the optical fiber MOPAs of FIG. 7. By way of example, the fiber MOPAs could be replaced by Q-switched, diode-pumped solid-state lasers such as Nd:YAG or Nd:YVO$_4$ lasers each of which can provide pulsed fundamental radiation at the 1064 nm wavelength. PRF of such lasers can be controlled by operating the Q-switches synchronously with the 5 MHz (or some other frequency) RF signal of oscillator 34 via an appropriate phase-shifter.

Figure 10:
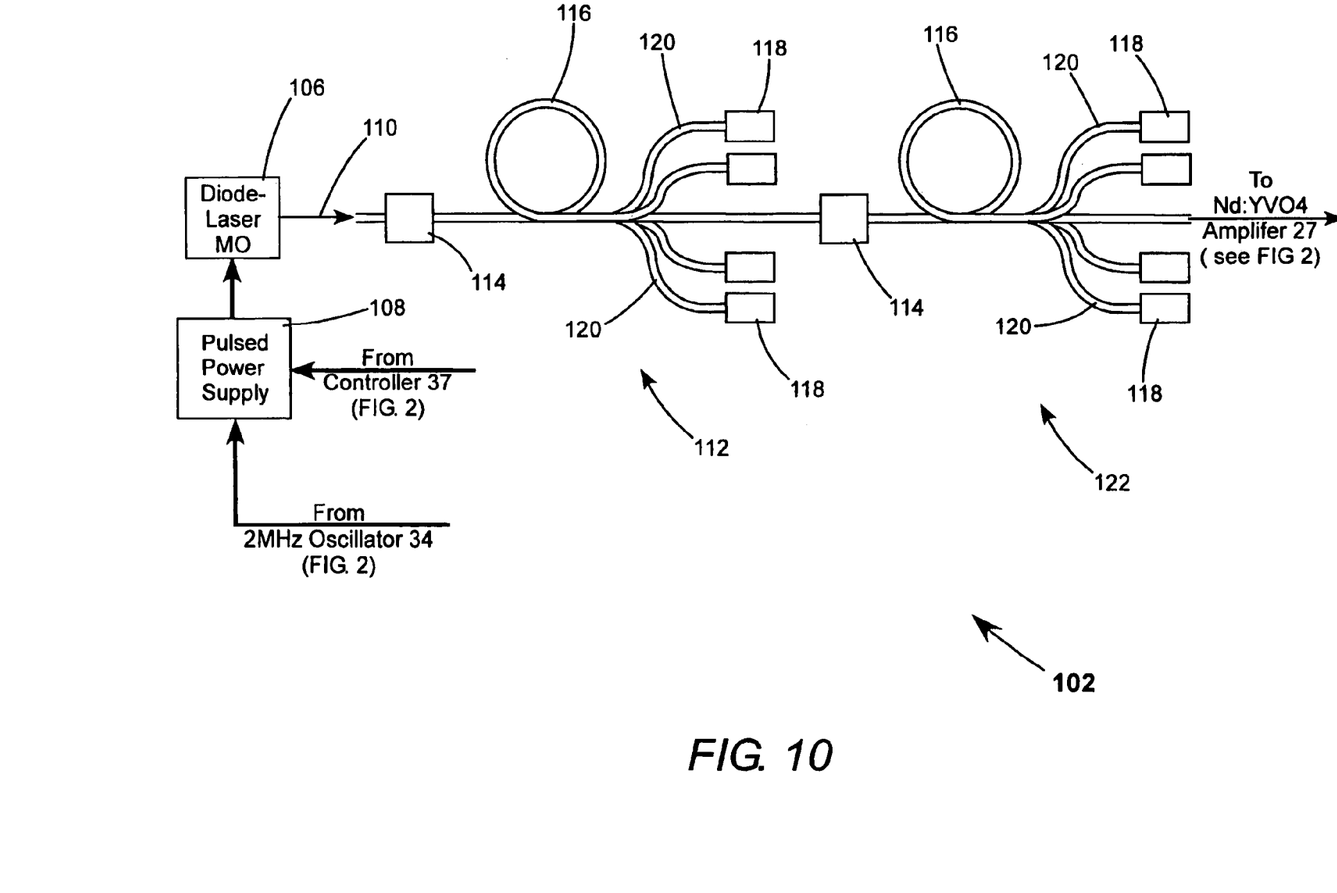
FIG. 10 schematically illustrates details of one preferred example of the first MOPA in the apparatus of FIG. 2.

FIG. 10 schematically illustrates a preferred example of quasi-CW 1064-nm source 102 for use in the apparatus 22A of FIG. 2. A single-mode diode-laser 106 driven by a pulsed power supply 108 serves as a master oscillator (MO), and provides pulsed output at a frequency (here 5 MHz) slaved to master clock 34 of apparatus 22A (see FIG. 2). Pulse duration is controlled by signals delivered to power supply 108 from controller 37 of apparatus 22A. Output from diode-laser 106 is directed by an optical arrangement (not shown) into a first optical fiber amplifier stage 112. Amplifier stage 112 includes an ytterbium-doped gain-fiber 116 optically pumped by a plurality (here, four) of diode-lasers 118 emitting CW radiation at a wavelength of 980 nm.

The output of each diode-laser 118 is coupled into cladding of the gain-fiber by a fiber 120 fused into the cladding of the gain fiber. An isolator 114 prevents feedback from amplifier stage 112 into the diode-laser. Amplified (pre-amplified) pulses are delivered from first amplifier stage 112 into a second fiber-amplifier stage 122, here, configured similarly to the first amplifier stage. Further pre-amplified pulses from amplifier stage 122 are delivered via an optical arrangement (not shown) to solid-state Nd:YVO$_4$ amplifier 27 of laser apparatus 22A (see FIG. 2) for final amplification. This arrangement is also suitable for use in MOPA 22B of the apparatus of FIG. 7, but with the Yb-doped fiber laser and fiber amplifier arranged to provide seed pulses at a wavelength of 1031 nm. Lasers (MOPAs) amplified by bulk amplifiers are capable of providing an average power output of up to 50 W for 1.0 ns pulses delivered at 5.0 MHz.

Figure 11:
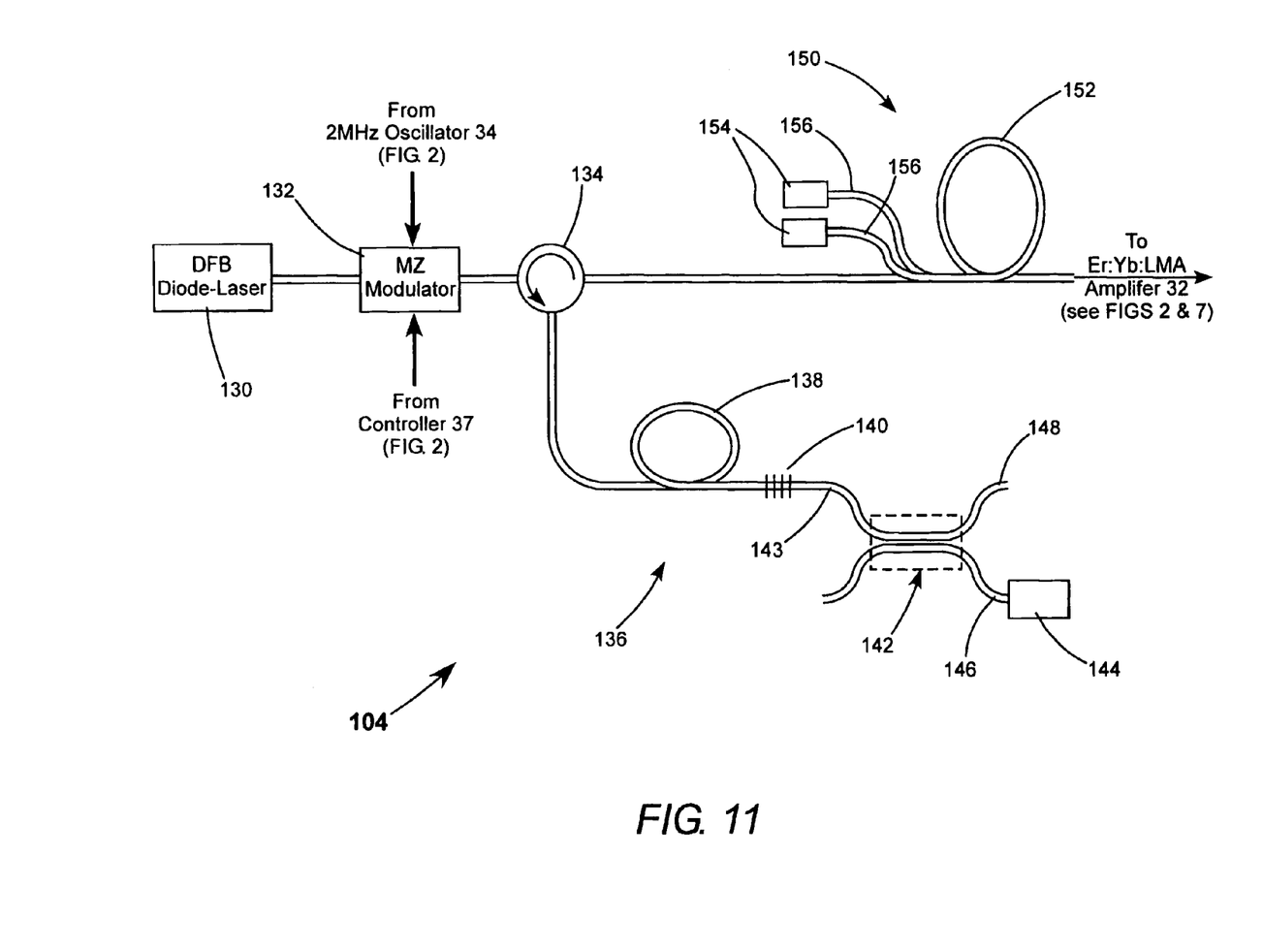
FIG. 11 schematically illustrates details of one preferred example of an amplified fiber laser suitable for use as the second MOPA in the apparatus of FIG. 2 or the apparatus of FIG. 7.

FIG. 11 schematically illustrates a preferred example of a 1547 nm source 104 suitable for apparatus 22A of FIG. 2 or for apparatus 22B of FIG. 7. A distributed feedback (DFB) single-mode diode-laser 130 delivers CW output at a wavelength of 1547 nm and serves as a master oscillator. Output of diode-laser 130 is fiber coupled to MZ modulator 132. MZ modulator converts the CW output to a train of pulses at a pulse repetition frequency (PRF) that is determined by the frequency of oscillator or master clock 34 of apparatus 22A (see FIG. 2). Pulse duration is controlled by keying-signals delivered to the MZ modulator from controller 37 of apparatus 22A. The train of pulses is directed by a circulator 134 into a first optical fiber amplifier stage 136.

Amplifier 136 is a double-pass amplifier including an erbium-doped gain-fiber 138 having a fiber Bragg grating (FBG) 140 at a distal end thereof and written into the core of the gain-fiber. FBG 140 is strongly reflective at a wavelength of 1547 nm and has a reflection bandwidth of about 1 nm or less. The distal end of the gain fiber is connected to a first port 143 of a wavelength division multiplexer (WDM) 142. Gain fiber 138 is optically pumped by CW radiation delivered by a diode-laser 144 and having a wavelength of 980 nm. The radiation from diode-laser 144 is coupled into gain-fiber 138 via a second port 146 of WDM 142. The FBG 140 reflects pulses amplified on a first pass through gain-fiber back through the gain fiber for amplification in a return pass. Most of any amplified spontaneous emission (ASE) generated in the first (forward) pass direction in the gain-fiber is transmitted by FBG 144, enters port 143 of the WDM, and exits the WDM via a third port 148 thereof.

Pulses that are pre-amplified in double-pass fiber amplifier 136 return to circulator 134 and are directed by the circulator into a second optical fiber amplifier stage 150 for further pre-amplification. Amplifier stage 150 includes an ytterbium-sensitized erbium-doped gain-fiber 152, optically pumped by a plurality (here, two) of diode-lasers 154, emitting CW radiation at a wavelength of 980 nm. The output of each diode-laser 154 is coupled into cladding of the gain-fiber by a fiber 156 fused into the cladding of the gain fiber. Amplified pulses from amplifier stage 150 are delivered via an optical arrangement (not shown) to Er:Yb:LMA fiber amplifier 32 as discussed above. Lasers (MOPAs) amplified by Er:Yb:LMA fiber amplifiers are capable of providing an average power output of up to 15 W for 1.0 ns pulses delivered at 5.0 MHz. This, as can be seen from the graphs of FIG. 4 and FIG. 9, is sufficient to provide UV output power up to 10 W.

In summary, the present invention is described above in terms of a preferred and other embodiments. The invention is not limited, however, to the embodiments described and depicted. Rather, the invention is limited only by the claims appended hereto.

What is claimed is:

1. A method of generating optical pulses, comprising the steps of:
    generating pulsed radiation having a first fundamental wavelength from a first laser, said first fundamental wavelength being between about 975 nm and 1150 nm;
    generating pulsed radiation having a second fundamental wavelength from a second laser, said second fundamental wavelength being between about 1500 nm and 1599 nm;
    frequency-multiplying said first-wavelength radiation to provide radiation having a wavelength which is a harmonic-wavelength of said first fundamental wavelength, said frequency multiplying step being performed using at least two, serially arranged non-linear crystals;
    in a first sum-frequency mixing step, sum-frequency mixing said harmonic-wavelength radiation with said second-fundamental-wavelength radiation to provide radiation having a first frequency-converted wavelength that is less than said harmonic-wavelength; and
    in a second sum-frequency mixing step, sum-frequency mixing said first frequency-converted-wavelength radiation with non-frequency multiplied, unconverted, second-fundamental-wavelength radiation to provide frequency-converted radiation having a second frequency-converted wavelength, said second frequency-converted wavelength being less than said first frequency-converted wavelength and being less than 200 nm.

2. The method of claim 1, wherein said first fundamental wavelength is between about 1000 nanometers and 1099 nanometers and said second fundamental wavelength is between about 1510 nanometers and 1599 nanometers.

3. The method of claim 2, wherein said first fundamental wavelength is about 1064 nm and said second fundamental wavelength is about 1547 nm.

4. The method of claim 2, wherein said first fundamental wavelength is about 1031 nm and said second fundamental wavelength is about 1547 nm.

5. The method of claim 1, wherein said harmonic-wavelength of said first fundamental wavelength is the fourth-harmonic wavelength.

6. The method of claim 5, wherein said first fundamental wavelength is about 1064 nm, said second fundamental wavelength is about 1547 nm, and said second frequency-converted wavelength is about 198 nm.

7. The method of claim 5, wherein said first fundamental wavelength is about 1031 nm, said second fundamental wavelength is about 1547 nm, and said second frequency-converted wavelength is about 193 nm.

8. The method of claim 1, wherein following said first sum-frequency mixing step there is a residual portion of said second-fundamental-wavelength radiation, and, in said second sum-frequency mixing step, said second-fundamental-wavelength radiation that is mixed with said first frequency-converted-wavelength radiation is said residual portion of said second-fundamental-wavelength radiation from said first sum-frequency mixing step.

9. A method of generating optical pulses, comprising the steps of:
    generating pulsed radiation having a first fundamental wavelength from a first laser, said first fundamental wavelength being between about 975 nm and 1150 nm;
    generating pulsed radiation having a second fundamental wavelength from a second laser said second fundamental wavelength being between about 1500 nm and 1599 nm;
    frequency-multiplying said first-wavelength output radiation to provide radiation having a wavelength which is the fourth harmonic-wavelength of said first fundamental wavelength, said frequency multiplying step being performed using at least two, serially arranged non-linear crystals;
    in a first sum-frequency mixing step, sum-frequency mixing said fourth-harmonic-wavelength radiation with said second-fundamental-wavelength radiation to provide radiation having a first frequency-converted wavelength that is less than said harmonic-wavelength, and residual second-fundamental-wavelength radiation; and
    in a second sum-frequency step, sum-frequency mixing said first frequency-converted-wavelength radiation with said residual portion of non-frequency multiplied, unconverted, second-fundamental-wavelength radiation from said first sum-frequency mixing step to provide frequency-converted radiation having a second frequency-converted wavelength, said second frequency-converted wavelength being less than about 200 nm.

10. The method of claim 9, wherein said first fundamental wavelength is between about 1000 nanometers and 1099 nanometers and said second fundamental wavelength is between about 1510 nanometers and 1599 nanometers.

11. The method of claim 10, wherein said first fundamental wavelength is about 1064 nm and said second fundamental wavelength is about 1547 nm.

12. The method of claim 10, wherein said first fundamental wavelength is about 1031 nm and said second fundamental wavelength is about 1547 nm.

13. Apparatus for generating pulses of optical radiation, comprising:
   a first laser apparatus arranged to generate pulses of radiation having a first fundamental wavelength between about 975 nm and 1150 nm;
   first and second optically nonlinear crystals arranged to generate pulses having the fourth-harmonic wavelength of said first fundamental wavelength, from said first-fundamental-wavelength pulses;
   a second laser apparatus arranged to generate pulses of radiation having a first fundamental wavelength between about 1500 nm and 1599 nm;
   a third optically nonlinear crystal arranged to sum-frequency mix said fourth-harmonic radiation pulses with said second-fundamental-wavelength pulses to provide pulses having a first frequency-converted wavelength and residual second-fundamental-wavelength pulses, said first frequency-converted wavelength being less than said fourth-harmonic wavelength;
   a fourth optically nonlinear crystal arranged to sum-frequency mix said first-frequency-converted-wavelength pulses with said residual non-frequency multiplied, unconverted, second-fundamental-wavelength pulses to provide pulses having a second frequency-converted wavelength, said second frequency-converted wavelength being less than said frequency-converted wavelength and less than 200 nm.

14. The apparatus of claim 13, wherein said first-fundamental-wavelength pulses and said second-fundamental-wavelength pulses are generated in respectively first and second repeated sequences of said pulses, said first and second sequences having the same pulse repetition frequency.

15. The apparatus of claim 14, further including a controller arranged to adjust the relative phase of said first and second repeated sequences of said pulses such that said fourth-harmonic radiation pulses and said second-fundamental-wavelength pulses temporally overlap at said third optically nonlinear crystal.

16. The apparatus of claim 15, wherein said first-fundamental-wavelength pulses and said second-fundamental-wavelength pulses have about the same temporal pulse width.

17. The apparatus of claim 16, wherein at least one of said first and second laser apparatuses each include means for selectively varying the temporal pulse width of said pulses generated thereby.

18. The apparatus of claim 17, wherein said pulse width varying means is a Mach-Zender modulator.

19. The apparatus of claim 15, wherein said first-frequency-converted-wavelength pulses and said residual second-fundamental-wavelength pulses travel along first and second separate optical paths to said fourth optically nonlinear crystal, and the length of said first and second optical paths is selected such that said first-frequency-converted-wavelength pulses and said residual second-fundamental-wavelength pulses temporally overlap at said fourth optically-nonlinear crystal.

20. The apparatus of claim 13, wherein said first laser apparatus includes a diode-laser for generating seed-pulses having said first fundamental wavelength, at least one fiber-amplifier stage for amplifying said seed-pulses, and a solid-state amplifier stage for further amplifying said amplified seed-pulses to provide said first-fundamental-wavelength pulses.

21. The apparatus of claim 13, wherein said second laser apparatus includes a diode-laser for generating seed-pulses having said second fundamental wavelength, at least one fiber-amplifier stage for amplifying said seed-pulses, and one of a solid-state amplifier stage and a fiber amplifier stage for further amplifying said amplified seed-pulses to provide said second-fundamental-wavelength pulses.

22. The apparatus of claim 13, wherein said second laser apparatus includes an erbium doped fiber laser.

23. A method as recited in claim 1, wherein said second sum frequency mixing step is performed in a nonlinear crystal formed from CLBO.

24. A method as recited in claim 9, wherein said second sum frequency mixing step is performed in a nonlinear crystal formed from CLBO.

25. A method as recited in claim 13, wherein said the fourth nonlinear crystal is formed from CLBO.

* * * * *